US009140267B2

(12) United States Patent
Sharp

(10) Patent No.: US 9,140,267 B2
(45) Date of Patent: Sep. 22, 2015

(54) COMPRESSOR

(75) Inventor: Nicholas Sharp, Stanley (GB)

(73) Assignee: Cummins Turbo Technologies Limited, Huddersfield (GB)

(*) Notice: Subject to any disclaimer, the term of this patent is extended or adjusted under 35 U.S.C. 154(b) by 1033 days.

(21) Appl. No.: 13/140,828

(22) PCT Filed: Dec. 18, 2009

(86) PCT No.: PCT/GB2009/002910
§ 371 (c)(1), (2), (4) Date: Nov. 7, 2011

(87) PCT Pub. No.: WO2010/072998
PCT Pub. Date: Jul. 1, 2010

(65) Prior Publication Data

US 2012/0039702 A1 Feb. 16, 2012

(30) Foreign Application Priority Data

Dec. 23, 2008 (GB) .................................. 0823372.8

(51) Int. Cl.
*F01D 25/24* (2006.01)
*F04D 27/02* (2006.01)
*F02C 6/12* (2006.01)

(52) U.S. Cl.
CPC ......... *F04D 27/0215* (2013.01); *F05B 2220/40* (2013.01)

(58) Field of Classification Search
CPC ... F04D 15/005; F04D 15/0011; F04D 15/02; F04D 15/0209; F04D 15/0245; F04D 15/0281; F04D 27/02; F04D 27/0207; F04D 27/0215; F05B 2220/40; F05B 2270/108; F05B 2270/1081
USPC ........... 415/1, 13, 20, 26–28, 52.1, 58.4, 101, 415/102, 115, 116, 118, 144, 145, 151, 415/182.1, 203, 206
See application file for complete search history.

(56) References Cited

U.S. PATENT DOCUMENTS 2,520,697 A 8/1950 Smith
3,044,683 A * 7/1962 Woollenweber, Jr. .......... 417/28
(Continued)

FOREIGN PATENT DOCUMENTS

JP 8028298 A 1/1996
WO WO2005/068842 A1 7/2005
WO WO 2006/022635 A1 3/2006

OTHER PUBLICATIONS

Search Report, GB0823372.8, UK Intellectual Property Office, Cummins Turbo Technologies Limited, Apr. 8, 2009.
(Continued)

*Primary Examiner* — Dwayne J White
*Assistant Examiner* — Alexander White
(74) *Attorney, Agent, or Firm* — Taft, Stettinius & Hollister LLP

(57) ABSTRACT

A compressor housing defines a gas inlet flow path and a gas outlet and a rotatable impeller wheel between the gas inlet flow path and the gas outlet. An inner wall of the housing defines a surface in close proximity to radially outer edges of impeller wheel vanes that sweep across the surface as the wheel rotates. An opening is provided in the inner wall at the surface. A port is provided in the housing in gas communication with the opening for diverting gas in a direction away from the inlet flow path during relatively low flow conditions. A gas displacement device is disposed outside of the inlet flow path and connected to the port, wherein the pump is operable to remove gas selectively through the opening and the port in a direction away from the inlet flow path.

14 Claims, 10 Drawing Sheets

(56) References Cited

U.S. PATENT DOCUMENTS

| | | | | | |
|---|---|---|---|---|---|
| 4,743,161 | A | | 5/1988 | Fisher et al. | |
| 5,399,064 | A | * | 3/1995 | Church et al. | 415/58.3 |
| 5,724,813 | A | | 3/1998 | Fenelon et al. | |
| 5,911,212 | A | * | 6/1999 | Benson | 123/563 |

OTHER PUBLICATIONS

International Search Report, PCT/GB2009/002910, Cummins Turbo Technologies Limited, ISA/European Patent Office, Jun. 9, 2010.

International Preliminary Report on Patentability, PCT/GB2009/002910, Cummins Turbo Technologies Limited, The International Bureau of WIPO, Geneva, Switzerland, Jun. 29, 2011.

* cited by examiner

COMPRESSOR

RELATED APPLICATION

The present application is a §371 filing of PCT/GB2009/002910, filed on Dec. 18, 2009, which claims priority to GB0823372.8, filed on Dec. 23, 2008, which are incorporated herein by reference.

The present invention relates to a compressor and more particularly, but not exclusively, to a centrifugal compressor for use in a turbocharger. It also relates to a turbocharger having such a compressor and a method for operating the same.

A centrifugal compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a scroll volute defined by the compressor housing around the impeller wheel and in the case of an axial compressor the gas is discharged axially.

The turbocharger is a well-known device for supplying air to the intake of an internal combustion engine at pressures above atmospheric (boost pressures) and is widely used on automobiles and the like. The compressor of a turbocharger is driven by an exhaust gas turbine that is mounted on a common shaft. Exhaust gas from the internal combustion engine flows through the turbine and drives the turbine wheel in rotation, which, in turn, rotates the compressor impeller. Air is drawn through an axial inlet of the compressor housing and compressed air is delivered to the intake manifold of the internal combustion engine, thereby increasing engine power.

One aspect of turbocharger control is to ensure stable operation by avoiding what is known as surge. If the turbocharger is operating at a relatively low compressor volumetric air flow rate and a high boost pressure the air flow into the compressor may stall and the operation of the compressor is interrupted. Following stall, the air flow tends to reverse through the compressor until a stable pressure ratio is reached at which the air can flow in the correct direction. This process repeats and results in pulsations in the air flow known as surging. Maximum operating efficiency of the engine is achieved by operating close to the surge limit and a surge margin is built into the control process to ensure that the turbocharger operates at a safe distance from the surge condition.

In some turbochargers the compressor inlet has a structure that has become known as a "map width enhanced" (MWE) structure. An MWE structure is described for instance in U.S. Pat. No. 4,743,161. The inlet of such an MWE compressor comprises two coaxial tubular inlet sections, an outer inlet section or wall forming the compressor intake and inner inlet section or wall defining the compressor inducer, or main inlet. The inner inlet section is shorter than the outer inlet section and has an inner surface that is an extension of a surface of an inner wall of the compressor housing which is swept by edges of the impeller wheel blades. The arrangement is such that an annular flow path is defined between the two tubular inlet sections, the path being open at its upstream end and provided with apertures or a slot (hereinafter referred to as the "MWE slot") at its downstream end that communicate with the inner surface of the compressor housing that faces the impeller wheel. In operation, the MWE slot allows additional air to be drawn into the compressor under high flow (near choke) conditions, however its most important function is at lower flow rates and, in particular, as the compressor approaches surge. Under these conditions the MWE slot allows the flow to reverse (which is now the prevalent flow regime in parts of the compressor) and to be re-circulated to the intake, thus delaying surge. The reversal of flow allows air to escape and thus reduces the tendency for the compressor to build up an unsustainably high pressure ratio.

It is well known that the MWE structure stabilises the performance of the compressor increasing the maximum flow capacity and improving the surge margin, i.e. decreasing the flow at which the compressor surges, so that the range of engine r.p.m. over which the compressor can operate in a stable manner is increased. A given compressor can thus be matched to engines with a wider speed range. This is known as increasing the width of the compressor "map", which is a plot of the compressor characteristic. However, the design of an MWE structure is a compromise involving a careful trade-off between the increased operating range of the compressor and a reduction in its overall efficiency.

It is one object of the present invention to obviate or mitigate the aforementioned, and/or other disadvantages. Another object is to provide for an improved, or alternative, compressor.

According to a first aspect of the present invention there is provided a compressor comprising: a housing defining a gas inlet flow path and a gas outlet; an impeller wheel having a plurality of vanes and mounted in the housing between the gas inlet flow path and the gas outlet, the wheel being rotatable about an axis; the housing having an inner wall defining a surface located in close proximity to radially outer edges of the impeller vanes which sweep across said surface as the impeller wheel rotates about its axis; at least one opening in the inner wall at the surface; a port in the compressor housing in gas communication with the at least one opening and for diverting gas in a direction away from the gas inlet flow path during relatively low gas flow rate conditions; and a gas displacement device disposed outside of the gas inlet flow path and connected to said port, the gas displacement device being operable to remove gas selectively through the at least opening and the port in a direction away from said gas inlet flow path.

The gas displacement device may be any suitable device such as, for example, a gas pump, compressor, a blower or fan. In the case of a pump it may be a centrifugal pump (axial or radial) or a positive displacement pump (rotary or reciprocating), any of which may be electrically driven from a suitable electrical source or alternatively may be driven by an internal combustion engine to which the compressor is connected. In one embodiment it may be a jet pump using a venturi effect to create an area of low pressure that acts as the suction source. The jet pump may have a convergent-divergent nozzle. In the case of a compressor it may be an axial or radial compressor.

The gas displacement device is a device that actively removes gas as opposed to a simple bleed passage that is opened and closed by a valve.

The gas displacement device may be arranged to remove gas through the port along a path external to the compressor housing. The device may be disposed outside of the compressor housing.

The compressor may be a centrifugal compressor.

There may be provided a valve that is selectively operable between an open position in which gas is permitted to flow through the port to the device and a closed position in which such flow is interrupted.

The gas displacement device may have an outlet that is arranged to discharge the removed air to a location at or upstream of the gas inlet.

The gas displacement device may have an inlet and an outlet and the valve may comprise a housing in which a valve member is movable, the valve housing having a first port in communication with the gas displacement device inlet, a second port in communication with the gas displacement device outlet, a third port in communication with the compressor housing gas inlet and a fourth port in communication with the port in the compressor housing, the valve member being movable to a third position in which permits gas communication between the first port and the third port and gas communication between the second port and the fourth port so that gas may be pumped from the compressor gas inlet and discharged to the port in the in the compressor housing.

Other ports may be provided to provide fluid communication with other components.

The valve may be disposed in the housing of the compressor or in a housing of the gas displacement device (e.g. a housing of a pump).

The valve may be a rotary valve which may comprise a generally cylindrical rotary valve member which may be penetrated by a plurality of openings. Each opening may be in the form of an elongated slot. The openings may be separated from one another by guides that may be planar or undulating.

The gas inlet flow passage may be defined by an outer tubular wall extending away from the impeller wheel in an upstream direction and forming a gas intake portion and an inner tubular wall extending away from the impeller wheel in an upstream direction within the outer tubular wall and defining an inducer portion and an annular passage defined between the inner and outer walls, the port being in gas communication with the annular passage.

The at least one opening may be in the form of a discontinuous annular slot.

The annular passage may be open at an upstream end of the gas inlet flow path.

The valve may be disposed at any convenient location including between the gas displacement device and the port, in the annular passage, in the port or in the at least one opening.

The port may be defined in the outer wall

According to a second aspect of the present invention there is provided a turbocharger comprising a compressor as defined above and a turbine for driving the compressor, the turbine having an outlet, the gas displacement device being arranged to discharge the removed gas to the turbine outlet.

The gas displacement device may take the form of a jet pump configuration disposed at or in the turbine outlet.

According to a third aspect of the present invention there is provided a turbocharger comprising: a compressor and a turbine for driving the compressor; the compressor comprising a housing defining a gas inlet and a gas outlet, an impeller wheel having a plurality of vanes and mounted in the housing between said inlet and outlet, the wheel being rotatable about an axis, the housing having an inner wall defining a surface located in close proximity to radially outer edges of the impeller vanes which sweep across said surface as the impeller wheel rotates about its axis, at least one opening in the inner wall at the surface, a port in the compressor housing in gas communication with the at least one opening and having an outlet spaced from the gas inlet; and a suction source in the form of a region of low pressure in the turbocharger connected to the port to allow removal of gas selectively through the opening and the port.

The region of low pressure in the turbocharger is provided by a location in the turbocharger that is, in use, at a lower pressure than the gas to be removed from the compressor inlet. It may be anywhere outside of the compressor inlet or gas inlet flow path, for example, within the turbine housing or a bearing housing. For example, it may be between a back face of a turbine wheel and a bearing housing which is disposed between the compressor and the turbine. Alternatively it may be provided by the flow conditions at an outlet of the turbine.

Such a turbocharger may include a valve between the port and the suction source, for selectively allowing the removal of gas. The valve may be of the kind defined above.

The valve housing may have a further conduit that is in gas communication with the outlet of the turbine or a jet pump disposed at or in the outlet, the valve member being movable to a position whereby gas removed from the port is discharged to the outlet.

The valve may have a yet further conduit which is in gas communication with a port in the bearing housing of the turbocharger. The valve may be movable to a position in which gas may be pumped from the bearing housing port to the gas inlet of the compressor.

According to a fourth aspect of the present invention there is provided a method for operating a turbocharger having a compressor with a gas inlet driven by a turbine, comprising permitting displacement of gas through at least one opening in an inner wall of the compressor housing at which there is defined a surface over which radially outer edges of a compressor impeller wheel sweep as it rotates, to a suction source in the form of a region of low pressure in the turbocharger other than at the inlet of the compressor or upstream of the inlet of the compressor.

The displaced gas may pass through a port in the compressor inlet. The displacement of gas preferably occurs when the compressor is operating near a surge limit and this may be detected by any suitable means e.g. a pressure sensor at the compressor inlet, a rotational speed sensor associated with the impeller wheel, a gas flow rate sensor at the compressor etc. A valve of the kind defined above may be actuated when the appropriate conditions have been detected. The actuation of the valve may be controlled by any suitable controller operating the turbocharger such as, for example, an engine management unit.

The region of low pressure in provided by a jet pump at an outlet of the turbine or it may be provided by the flow conditions at the outlet of the turbine.

Specific embodiments of the present invention will now be described, by way of example only, with reference to the accompanying drawings, in which.

Figure 9A:
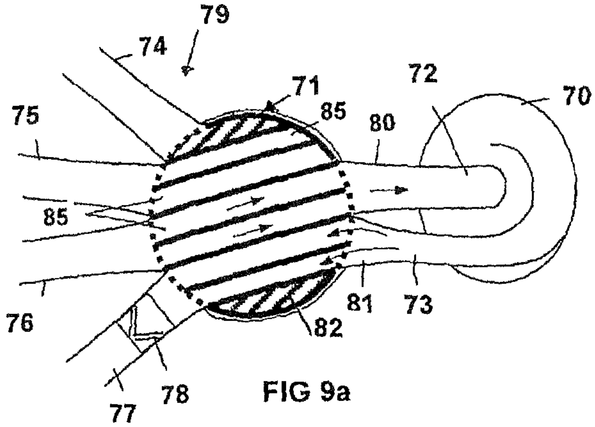
Figure 9B:
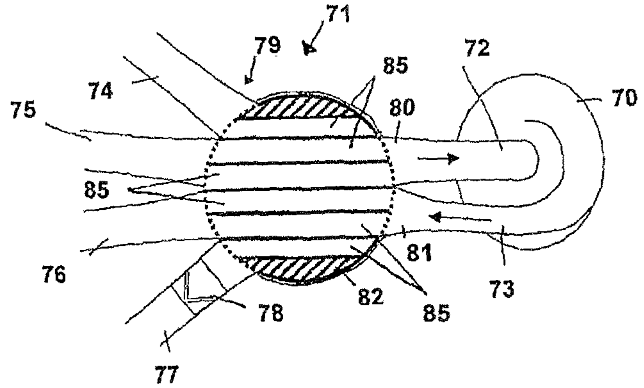
Figure 9C:
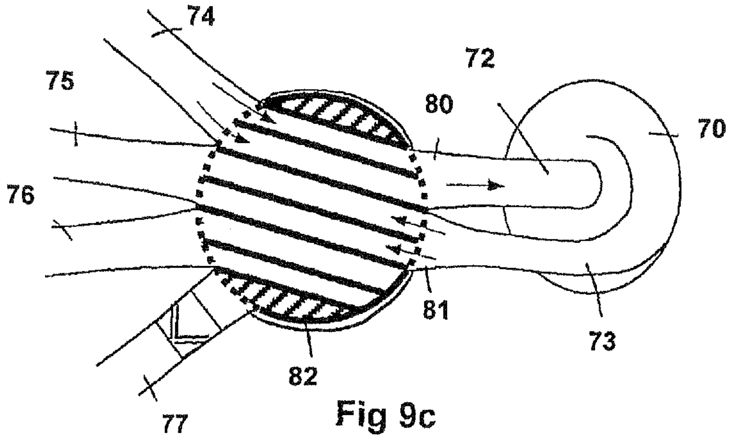
Figure 9D:
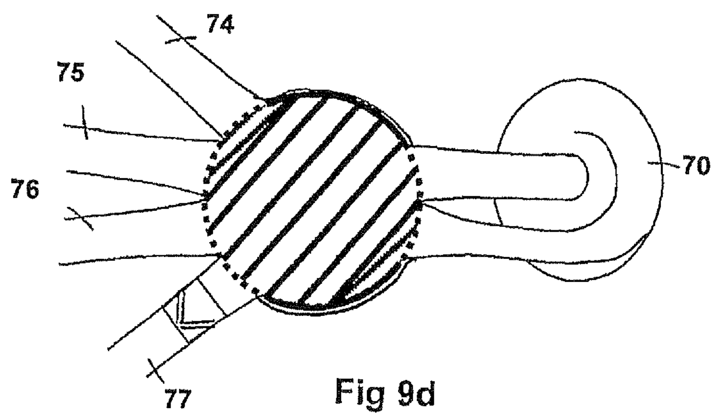
Figure 10:
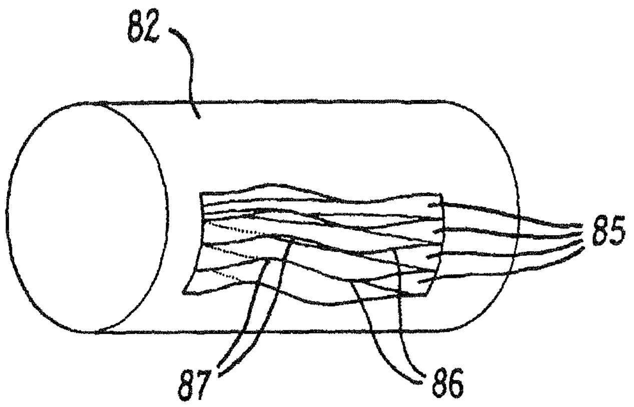

FIGS. 9*a* to 9*d* are schematic representations of different positions of a valve for use with the present invention;

FIG. 10 is a perspective view of an exemplary embodiment of the valve of FIGS. 9*a* to 9*d;*

Figure 11:
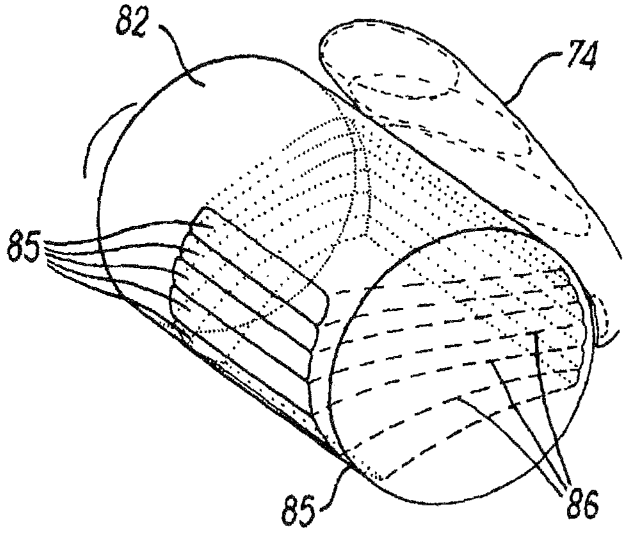
Figure 12:
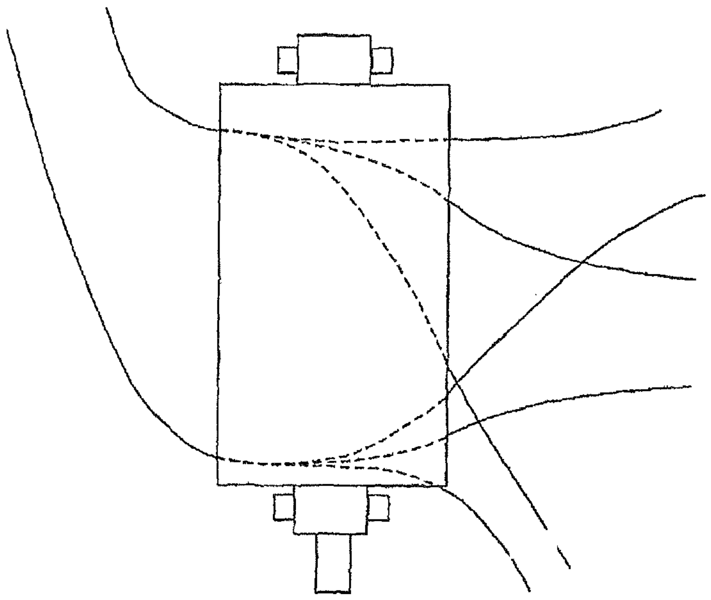

FIG. 11 is a perspective view of an alternative exemplary embodiment of the valve of FIGS. 9*a* to 9*d*; and FIG. 12 is a schematic plan view of an embodiment of the valve of FIGS. 9*a* to 9*d* shown in a valve manifold.

Figure 1:
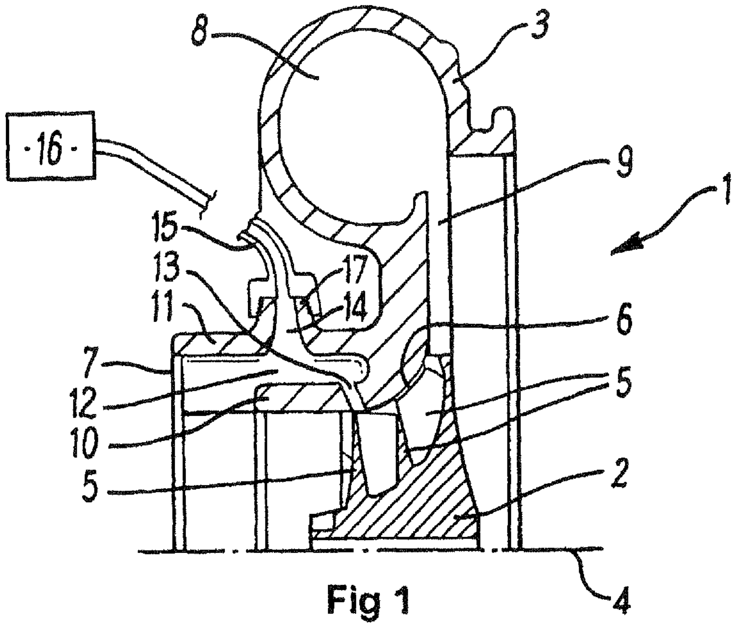
FIG. 1 is a sectioned longitudinal view of a first embodiment of part of a compressor in accordance with the present invention.

Referring first to FIG. 1, the illustrated compressor is a centrifugal compressor 1 of the kind used in a turbocharger. The compressor 1 comprises an impeller wheel 2 mounted within a compressor housing 3 on one end of a rotating shaft that extends along a compressor axis 4. In the figure only the half of compressor above the axis 4 is shown, the remaining half being substantially symmetric about the axis 4. The wheel 2 typically has a plurality of vanes 5 each of which has an outer edge that sweeps across an interior surface 6 of the housing when the impeller wheel 2 rotates about the axis 4.

The compressor housing 3 defines an air inlet 7 that directs air to the impeller wheel 2. The air is compressed by the wheel 2 and delivered to an outlet scroll volute 8 surrounding the impeller wheel via an intermediate diffuser 9. The inlet 7 is defined by concentric inner and outer walls 10, 11 that extend coaxially with the compressor axis 4 away from the impeller wheel 2. The inner wall 10 is substantially cylindrical and defines a gas inducer part of the inlet 7 upstream of the wheel 2 and the interior surface 6 over which the outer edges of the impeller wheel vanes 4 sweep. The outer wall 11 is similarly substantially cylindrical and defines an intake portion of the inlet. It extends beyond the inner wall 10 at the upstream end. The arrangement is such that an annular flow passage 12 is defined between the two tubular walls 10, 11, the passage being open at its upstream end and closed at a downstream end save for a discontinuous annular slot 13 through the inner wall 10 that provides air communication between the radial impeller wheel 2 and interior of the annular flow passage 12. The slot 13 is made discontinuous by a plurality of webs (not shown in FIG. 1) that bridge the slot at intervals around its circumference.

The outer wall 11 of the inlet 7 is penetrated by one or more ports 14 which are connected by a respective conduit 15 (e.g. a flexible hose) to the inlet of a pump 16 (represented schematically). A boss 17 is defined on the external surface of the outer wall 11 around each port so as to provide a connection point for each conduit. In an embodiment where there are multiple ports 14 these may be arranged at spaced locations around the compressor inlet 7.

Figure 3:
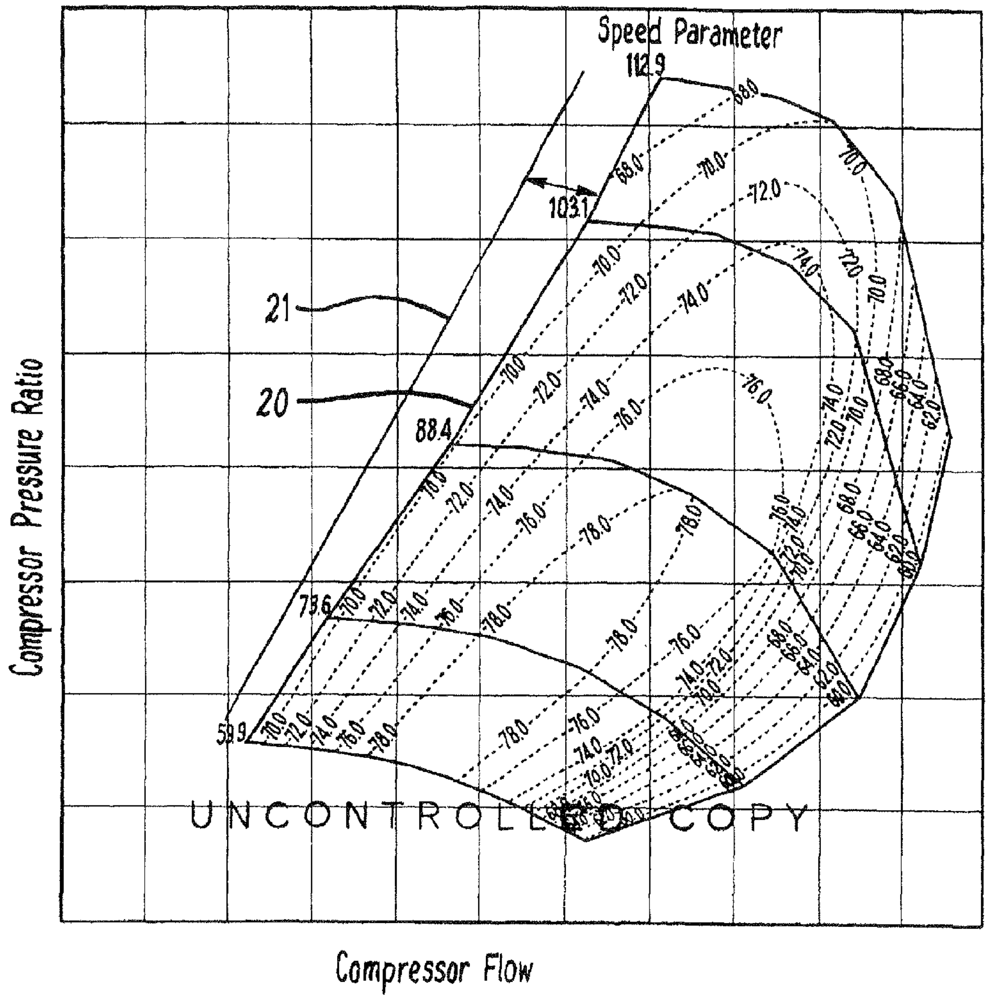
FIG. 3 is a compressor map illustrating the performance of a prior art compressor compared to a compressor of the present invention.

At relatively high flow rates the compressor inlet 7 operates in the same manner as a conventional MWE inlet structure in that the slot 13 and passage 12 allow additional air to be drawn into the compressor to the wheel 2. At relatively low flow rates the amount of air drawn into the wheel 3 through the slot 13 decreases to a point where the pressure of the air in slot 13 immediately adjacent to the vanes 5 is greater than the air pressure in the passage so that the air flow direction in the passage 12 reverses. Under these conditions the pump is operated to encourage excess air to escape through the annular slot 13 and the annular flow passage 12 and thus bypass the compressor diffuser 9 and outlet volute 8. The removed air may be re-circulated by the pump 16 to the intake, further upstream or to atmosphere, thus delaying surge. An indication of the potential for improved surge margin using the present invention is illustrated in the compressor map plot of FIG. 3. Such a map is a plot of normalised mass air flow (x axis) through the compressor against the pressure ratio across the compressor (y axis) for different rotational speeds of the impeller wheel 2 (the speed being represented by the solid lines that extend from let to right) and the left hand diagonal line 20 of the plot is known as the "surge line" where surge conditions occur for a compressor with a conventional MWE inlet structure. The potential movement of the surge line further to the left by using the pump of FIG. 1 is represented by a second surge line 21. This movement effectively increases the operating range of the compressor.

Figure 2:
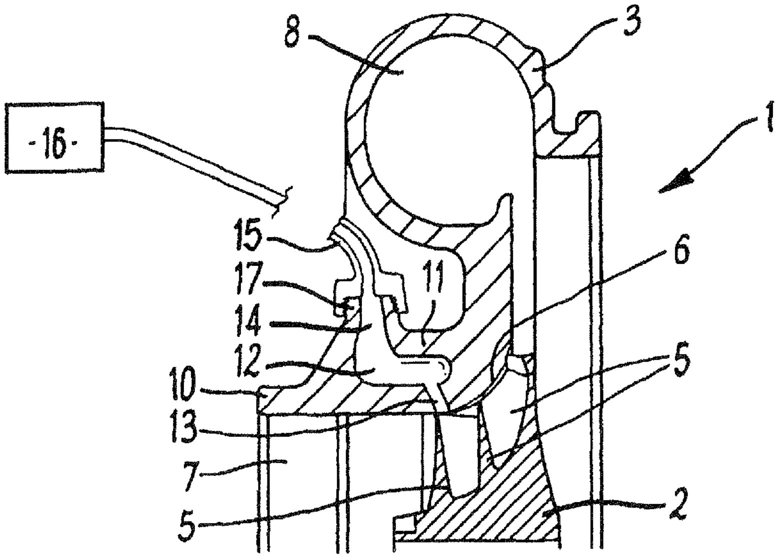
FIG. 2 is a section longitudinal view of a second embodiment of part of a compressor in accordance with the present invention.

FIG. 2 shows an alternative compressor configuration to that of FIG. 1. For convenience the same reference numbers have been used. The only significant difference between this embodiment and that of FIG. 1 is that the open end of the annular passage 12 is closed. Once again, at low flow rates the air is removed by a pump 16 away from the impeller wheel 2 through the slot 13 and the annular passage 12 to be diverted away from the inlet flow and then discharged to a suitable location such as back to the intake (or further upstream of the intake flow path) or to atmosphere.

Figure 4:
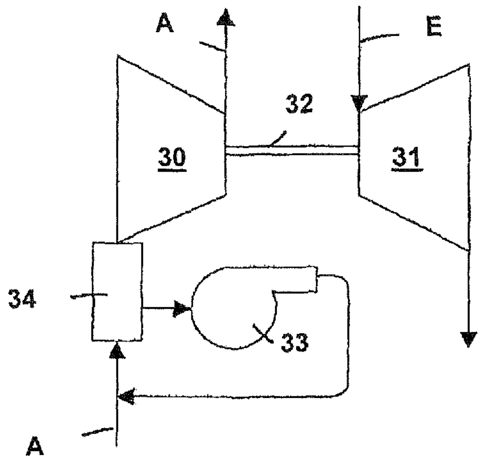
FIG. 4 is a schematic representation of a first embodiment of a turbocharger having a compressor in accordance with the present invention.

FIG. 4 is a schematic representation of one embodiment of a turbocharger comprising a compressor 30 driven by an exhaust gas turbine 31 mounted on a common shaft 32. Exhaust gas E from an internal combustion engine (not shown) flows through the turbine 31 and drives the turbine wheel in rotation, which, in turn, rotates the compressor impeller wheel. Air A is drawn through the inlet of the compressor housing and compressed air is delivered to the intake manifold (not shown) of the internal combustion engine, thereby increasing engine power. The configuration shown in FIG. 4 has a compressor 30 with a pump 33 that is selectively operable to remove air from an inlet structure 34 of the compressor 30, of which the embodiments of FIGS. 1 and 2 are examples, and discharges it to a location upstream of the compressor housing inlet structure 34. The pump 33 may be of any suitable kind including, for example, a centrifugal pump, a positive displacement pump. It will be appreciated that any suitable kind of gas displacement device may be used including, for example, an axial or radial 1 compressor, a blower or a fan. Such a device actively removes gas in contrast to a bleed passage that allows gas to bleed away via a valve that is used to open or close the passage.

Figure 5:
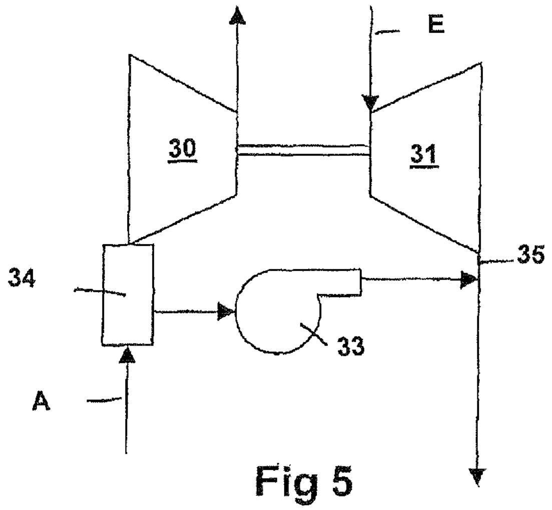
FIG. 5 is a schematic representation of a second embodiment of a turbocharger having a compressor in accordance with the present invention.

FIG. 5 shows an alternative embodiment of a turbocharger in which the pump 33 discharges the air removed from the inlet structure 34 to an outlet 35 of the turbine 31.

Figure 6:
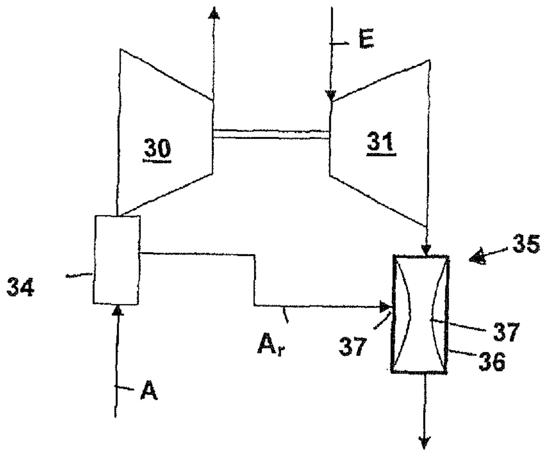
FIG. 6 is a schematic representation of a third embodiment of a turbocharger having a compressor in accordance with the present invention.

In FIG. 6 there is shown a further alternative similar to that of FIG. 5 but in which the pumping action is provided by a venturi jet pump 36 such as an ejector pump or an eductor that uses the venturi effect of a convergent-divergent nozzle to apply suction. In the example shown the jet pump 36 is situated at the outlet 35 of the turbine 31. The exhaust flow E from the turbine 31 passes through the convergent-divergent nozzle and develops a relatively low pressure at a throat 37. The annular passage 12 of the inlet structure 34 is connected to an inlet 38 at the throat area 37 so that the removed air Ar is drawn into the nozzle of the pump 36 and entrained in the exhaust gas E. The inlet 38 at the throat 37 of the jet pump 36 may be connected to the port 14 in the compressor housings of FIG. 1 or 2. The jet pump 36 may be disposed within an outlet 35 defined by a housing of the turbine 31 or may be attached downstream of the outlet 35. The jet pump 36 may be provided by any suitable structure that is equivalent to the convergent-divergent nozzle and may be provided simply by the prevailing exhaust gas flow conditions in the outlet rather than a specifically adapted structure.

Figure 7:
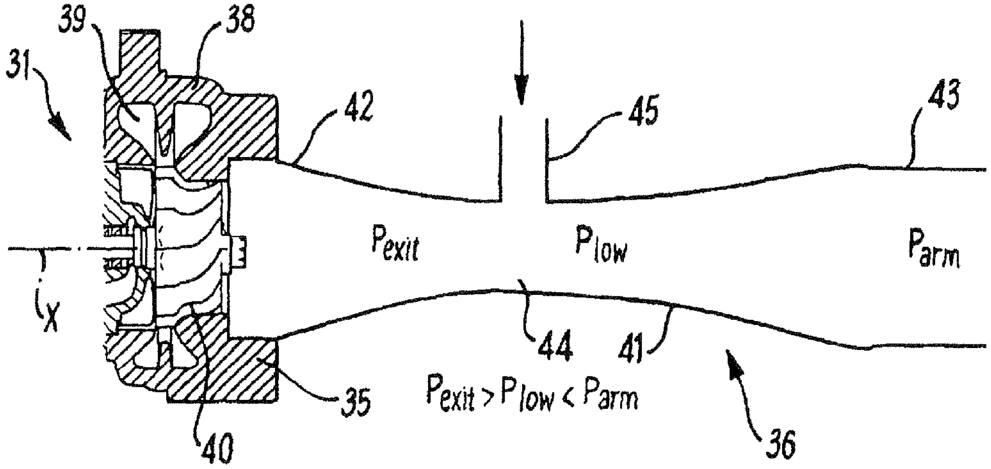
FIG. 7 is a sectioned view through a turbocharger turbine with a jet pump disposed at the outlet for connection to a compressor in accordance with an aspect the present invention.

An embodiment of a jet pump 36 attached to a turbine outlet 35 is illustrated in FIG. 7, the pump 36 being exaggerated in size for ease of understanding and clarity. The turbine 31 comprises a housing 38 that defines an inlet chamber 39 to which exhaust gas from the exhaust manifold of the internal combustion engine (not shown) is delivered. The exhaust gas flows from the inlet chamber 39 to the outlet 35 defined by the housing 38 via a turbine wheel 40 which is thus driven in rotation about axis X. The jet pump 36 is connected to the outlet 35 and comprises a convergent-divergent nozzle 41 with an exhaust gas inlet 42 connected to the turbine outlet 35, an exhaust gas outlet 43 open to atmosphere (or for connection to an exhaust gas recirculation path) and an intermediate throat 44 at which there is an air inlet 45. The venturi effect provided by the exhaust gas flowing through the nozzle 41 ensures that the pressure $P_{exit}$ of the exhaust gas flowing from the turbine outlet 35 through the nozzle 41 decreases to a relatively low magnitude $P_{low}$ at the throat 44 before increasing again at the nozzle outlet 43 to a value $P_{atm}$ (which may not be atmospheric pressure in some circumstances). The air inlet 45 is connected to the annular passage 12 of the compressor inlet structure 34 as described above.

It is thought that in some applications it may be possible to rely upon the aerodynamic effects in the wake of the turbine to provide the reduced pressure area required to pump air without the need for a specific nozzle attachment, although a reduction in the diameter of the turbine exducer downstream of the trailing edge of the turbine wheel is desirable.

Figure 8:
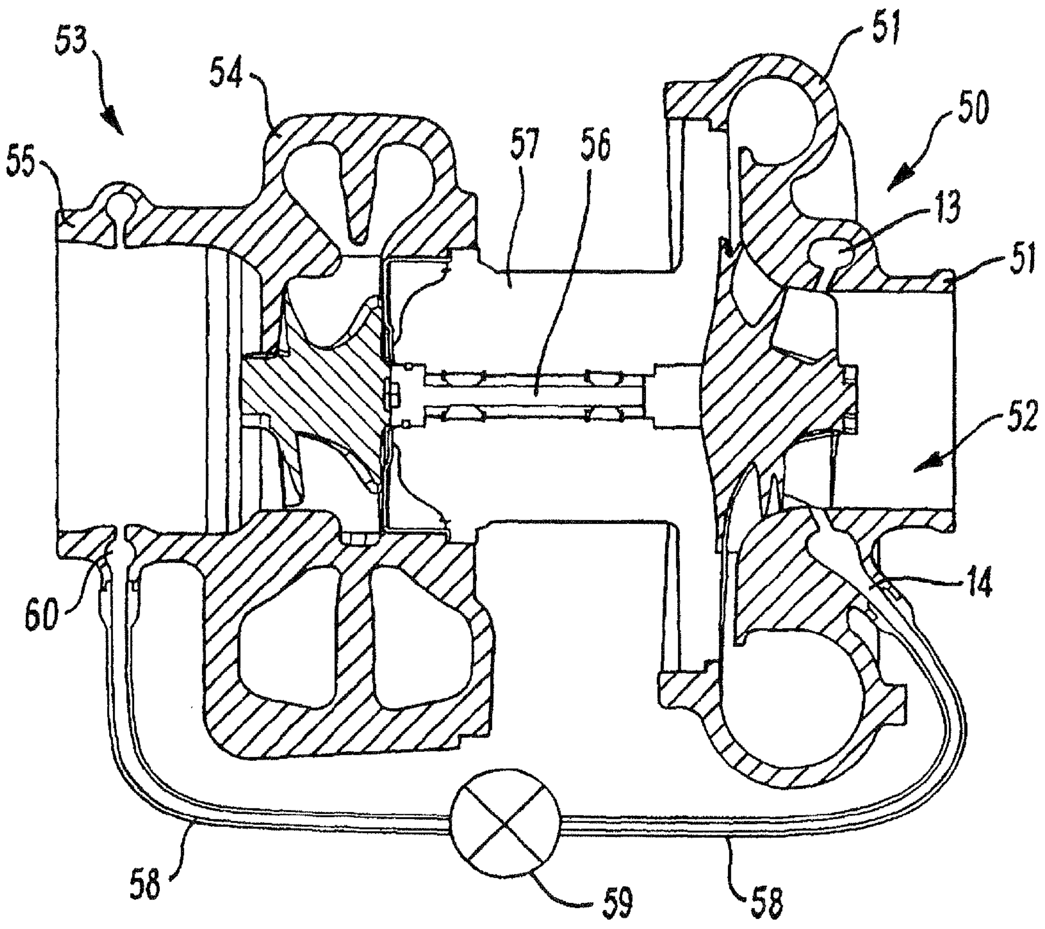
FIG. 8 is a sectioned longitudinal view of a turbocharger in accordance with an aspect of the present invention.

It may be desirable in all of the above embodiments to provide a valve that is controlled by an actuator selectively to interrupt the removed air flow from the annular passage of the compressor inlet structure. Thus at relatively low air flow rates the valve is open to allow flow away from the annular inlet passage. The flow rate is sensed (either directly or by sensing the rotational velocity of the impeller wheel) and used to control the actuator such that the valve is closed when the flow rate is relatively high so as to prevent removal of the air from the annular passage. The actuator may be an electric actuator such as a motor with a suitable transmission such as, for example, a leadscrew. An example is shown in FIG. 8 in the context of a turbocharger with a compressor 50 having a housing 51 defining an inlet structure 52 similar to that of FIG. 2. The compressor 50 is driven by an exhaust gas flow turbine 53 having a housing 54 defining at outlet 55 and which is connected to the compressor 50 by a turbocharger shaft 56 that passes through a bearing housing 57 intermediate the compressor and turbine housings 51, 54. An air hose 58 (or any other suitable type of conduit) is connected between the annular passage 13 of the compressor inlet 52 and the outlet 55 of the turbine 53. Flow through the air hose 58 is selectively interruptible by a valve 59. At low flow rates at the compressor inlet 52, the valve 59 is open to allow air to be removed from the annular passage 13 at the compressor inlet 52 and discharged to the outlet 55 of turbine. The means for driving the air in this direction may be provided by virtue of a pumping force generated by the exhaust gas flow in the turbine outlet 55 or by a specific structure which may take the form of a jet pump arranged at the turbine outlet as described above. The hose 58 is connected between the port 14 of the compressor housing 51 and a similar port 60 defined in the turbine housing 54 at the outlet 55

The valve 59 may take any suitable form e.g. a flap or butterfly valve. It may be integrated into the compressor housing or the pump housing.

It will be understood that the air may be removed from the compressor inlet structure by any suitable gas displacement device as described above in relation to FIGS. 1 and 2. The device (e.g. pump) may be driven electrically by, for example, a battery of the vehicle, a motor/generator associated with the engine or a separate turbine, which may be connected in series with the turbocharger. Alternatively it may be driven directly or indirectly from the engine crankshaft It will be appreciated that as an alternative to using a dedicated gas displacement device the annular inlet passage of the compressor may simply be connected (optionally via a valve) to an area of prevailing low pressure in the turbocharger or the engine system such as, for example, to the low pressure region in the bearing housing behind the turbine wheel area. A suitable conduit may be connected to a port on the bearing housing. Alternatively the pumping action may be provided by other components already present in the engine drive chain such as, for example, an air conditioning fan, a brake-air compressor or a crankcase vacuum pump.

In the embodiment depicted schematically in FIGS. 9*a*-9*d* the gas displacement device 70 is in the form of a small compressor and is selectively connectable to the removed air flow from the compressor by a multi-position valve 71 that allows the compressor 70 to have several purposes. In the exemplary embodiment shown, the compressor 70 has an inlet 72 and an outlet 73 that are selectively connectable to four conduits. A first conduit 74 is connected to a port (not shown) in the turbocharger bearing housing, a second conduit 75 is connected to the compressor inlet path (at the compressor housing or further upstream), a third conduit 76 is connected to the removed air flow path from the annular inlet passage 13 of the compressor inlet 7, 34, 52, and a fourth conduit 77 is connected to the exhaust outlet of the turbocharger (e.g. at the outlet of the turbine). The fourth conduit 77 contains a one-way valve 78 to prevent exhaust gas being drawn into the system.

The valve 71 comprises a housing 79 defining the four conduits 74, 75, 76, 77 and two further conduits 80, 81 for connection to the inlet 72 and outlet 73. Within the housing 79 a valve member 82 is in the form of a rotary barrel-type member that is penetrated by multiple flow paths that are selectively brought into register with the different conduits. The flow paths are defined by slotted openings 85, an adjacent two of which may be connected between conduit pairs as shown. The valve member 82 is actuable to occupy four principal positions as shown in FIGS. 9*a*-9*d*. In FIG. 9*a* the valve member 82 is disposed at a rotary position in which the inlet 72 of the compressor 70 is in flow communication with the third conduit 76 and the outlet 73 is in communication with the fourth conduit 77 so that air can be pumped from the annular flow passage 13 of the compressor inlet and discharged to the turbocharger outlet in accordance with the principles described in relation to the preceding embodiments. The valve 71 is operated to adopt this position when there is a relatively low air flow rate at the compressor. In FIG. 9*b* the valve member 82 is rotated to a position such that the pump inlet 72 is in flow communication with the second conduit 75 and therefore compressor inlet, and the pump outlet 73 is in flow communication with the third conduit 76. In this position air is pumped from the compressor inlet path into the annular flow passage. Generally the valve 71 is moved to this position at relatively high air flow rates at the compressor and this serves to improve the choke flow limit. In FIG. 9*c* the valve occupies a position whereby the pump inlet 72 draws air from the bearing housing (the first conduit 74) and delivers it to the compressor inlet. This serves to reduce the pressure in the bearing housing of the turbocharger and contributes to the operation of the compressor by supplying air to the impeller wheel. In the position shown in FIG. 9*d*, all paths are blocked. In this position the air flow through the annular passage at the compressor inlet is not required in either direction and the efficiency of the compressor may be increased.

Detailed exemplary embodiments of the valve member 82 are shown in FIGS. 10 to 12. In both embodiments the valve member is substantially cylindrical about an axis and has four slotted openings 85 extending in a direction transverse to the axis. The slots 85 are defined between flow guides 86 that may be machined integrally in the member or provided as separate inserts. In the embodiment of FIG. 10 the guides 86 have undulations 87 to accommodate thermal expansion or contraction. In the embodiment of FIGS. 11 and 12 the guides 86 are depicted as substantially planar but it is to be appreciated that they may take the form of those in FIG. 10. Each of the conduits 74-77 (one shown in FIG. 11 and four shown in FIG. 12) is shaped such that they widen and flatten as they approach the valve. This ensures that the valve design can be kept to a reasonable size. In the embodiment of FIG. 11 there are six slots 85 rather than four, the two extra paths being available for other conduits. Any suitable number may be provided depending on the particular application.

It will be appreciated that numerous modifications to the above described designs may be made without departing from the scope of the invention as defined in the appended claims.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A compressor comprising:

a housing defining a gas inlet flow path and a gas outlet;

an impeller wheel having a plurality of vanes and mounted in the housing between the gas inlet flow path and the gas outlet, the wheel being rotatable about an axis;

the housing having an inner wall defining a surface located in close proximity to radially outer edges of the impeller vanes which sweep across said surface as the impeller wheel rotates about its axis;

at least one opening in the inner wall at the surface;

a port in the compressor housing in gas communication with the at least one opening and for diverting gas in a direction away from the gas inlet flow path during relatively low gas flow rate conditions;

a gas displacement device disposed outside of the gas inlet flow path and connected to said port, the gas displacement device being operable to remove gas selectively through the at least one opening and the port in a direction away from said gas inlet flow path; and a valve that is selectively operable between an open position in which gas is permitted to flow through the port to the gas displacement device and a closed position in which such flow is interrupted;

wherein the gas displacement device has an inlet and an outlet and the valve comprises a housing in which a valve member is movable, the valve housing having a first port in communication with the gas displacement device inlet, a second port in communication with the gas displacement device outlet, a third port in communication with a gas flow path through the compressor housing gas inlet and a fourth port in communication with the port in the compressor housing, the valve member being movable to a third position in which permits gas communication between the first port and the third port and gas communication between the second port and the fourth port so that gas may be removed from the compressor gas inlet and discharged to the port in the compressor housing.

2. The compressor according to claim 1, wherein the gas displacement device is arranged to discharge the removed gas to a location at or upstream of the gas inlet.

3. The compressor according to claim 1, wherein the valve is disposed in the housing of the compressor.

4. The compressor according to claim 1, wherein the gas displacement device has a device housing and the valve is disposed in the device housing.

5. The compressor according to claim 1, wherein the gas displacement device is a pump.

6. The compressor according to claim 5, wherein the pump is a jet pump.

7. A turbocharger comprising a compress and a turbine for driving the compressor, the compressor comprising:

a housing defining a gas inlet flow path and a gas outlet;

an impeller wheel having a plurality of vanes and mounted in the housing between the gas inlet flow path and the gas outlet, the wheel being rotatable about an axis;

the housing having an inner wall defining a surface located in close proximity to radially outer edges of the impeller vanes which sweep across said surface as the impeller wheel rotates about its axis;

at least one opening in the inner wall at the surface;

a port in the compressor housing in gas communication with the at least one opening and for diverting gas in a direction away from the gas inlet flow path during relatively low gas flow rate conditions; and a gas displacement device disposed outside of the gas inlet flow path and connected to said port, the gas displacement device being operable to remove gas selectively through the at least one opening and the port in a direction away from said gas inlet flow path, the turbine having an outlet, the gas displacement device being arranged to discharge the removed gas to the turbine outlet.

8. The turbocharger according to claim 7, wherein the gas displacement device is a jet pump, the jet pump being arranged to discharge the removed gas to the turbine outlet, wherein the jet pump is disposed at or in the turbine outlet.

9. A turbocharger comprising:

a compressor and a turbine for driving the compressor, the compressor comprising:

a housing defining a gas inlet and a gas outlet, an impeller wheel having a plurality of vanes and mounted in the housing between said gas inlet and said gas outlet, the wheel being rotatable about an axis, the housing having an inner wall defining a surface located in close proximity to radially outer edges of the impeller vanes which sweep across said surface as the impeller wheel rotates about its axis, at least one opening in the inner wall at the surface, a port in the compressor housing in gas communication with the at least one opening and having an outlet spaced from the gas inlet;

the turbine comprising a turbine housing for receipt of a turbine wheel; and a suction source in the form of a region of low pressure distinct from the gas inlet in the turbocharger connected to the port to allow removal of gas selectively through the at least one opening and the port, wherein the turbocharger further comprises a bearing housing, between the turbine and compressor housings, for housing bearings for a shaft for interconnecting the compressor impeller wheel and the turbine wheel, a further port defined in the turbine or bearing housing in fluid communication with the region of low pressure.

10. The turbocharger according to claim 9, wherein the region of low pressure is between a back face of the turbine wheel and the bearing housing.

11. A method for operating a turbocharger, having a compressor with a gas inlet and a turbine for driving the compressor, comprising:

permitting displacement of gas through at least one opening in an inner wall of a compressor housing at which there is defined a surface over which radially outer edges of a compressor impeller wheel sweep as the compressor impeller wheel rotates, to a suction source in the form of a region of low pressure in the turbocharger, wherein the region of low pressure is distinct from the gas inlet of the compressor, wherein the region of low pressure is provided by a jet pump at an outlet of the turbine or by flow conditions at an outlet of the turbine or between a back face of the turbine wheel and a bearing housing of the turbocharger.

12. The method for operating a turbocharger according to claim 11, wherein the displaced gas passes through a port in the gas inlet of the compressor.

13. The method according to claim 12, wherein the displacement of gas occurs when the compressor is operating at or near a surge limit.

14. The method according to claim 13 further comprising the step of detecting when the compressor is operating at or near a the surge limit.

* * * * *